United States Patent
Iizuka et al.

(10) Patent No.: US 10,669,456 B2
(45) Date of Patent: Jun. 2, 2020

(54) ADHESIVE RESIN COMPOSITION AND LAMINATE

(71) Applicant: FUJIMORI KOGYO CO., LTD., Tokyo (JP)

(72) Inventors: Hirokazu Iizuka, Tokyo (JP); Kunihiro Takei, Tokyo (JP); Jun Suzuki, Tokyo (JP)

(73) Assignee: FUJIMORI KOGYO CO., LTD., Tokyo (JP)

(*) Notice: Subject to any disclaimer, the term of this patent is extended or adjusted under 35 U.S.C. 154(b) by 0 days.

(21) Appl. No.: 16/052,617

(22) Filed: Aug. 2, 2018

(65) Prior Publication Data

US 2019/0062605 A1 Feb. 28, 2019

(30) Foreign Application Priority Data

Aug. 23, 2017 (JP) ................. 2017-160387

(51) Int. Cl.
*C09J 123/26* (2006.01)
*C09J 151/06* (2006.01)

(52) U.S. Cl.
CPC .......... *C09J 123/26* (2013.01); *C09J 151/06* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 2012/0046418 A1* | 2/2012 | Seo | ......... | C08C 19/22 525/329.3 |
| 2012/0279654 A1* | 11/2012 | Jialanella | ........... | C08G 18/2081 156/331.1 |
| 2015/0315400 A1* | 11/2015 | Yano | ......... | A43B 9/12 524/113 |
| 2016/0036013 A1 | 2/2016 | Nakazato et al. | | |
| 2016/0280901 A1* | 9/2016 | Ohfuji | ......... | C08J 3/05 |
| 2017/0088753 A1 | 3/2017 | Nakamura et al. | | |
| 2017/0096586 A1* | 4/2017 | Sakata | ......... | B32B 15/08 |
| 2019/0062604 A1* | 2/2019 | Iizuka | ......... | C09J 151/06 |

FOREIGN PATENT DOCUMENTS

| | | |
|---|---|---|
| CN | 105315934 A | 2/2016 |
| JP | 5771493 B2 | 9/2015 |
| WO | 2014/088015 A1 | 6/2014 |
| WO | WO-2015083721 A1 * | 6/2015 |
| WO | WO-2015190411 A1 * | 12/2015 |
| WO | 2016/042837 A1 | 3/2016 |

OTHER PUBLICATIONS

Office Action for Korean Patent Application No. 10-2018-0090306 dated Dec. 16, 2019 and English translation thereof; 14 pgs.
Office Action for Chinese Patent Application No. 201810872179.8 dated Apr. 15, 2020 and English abstract thereof; 5 pgs.

* cited by examiner

*Primary Examiner* — Anish P Desai
(74) *Attorney, Agent, or Firm* — Hauptman Ham, LLP

(57) ABSTRACT

Provided are an adhesive resin composition that can be uniformly applied, has high adhesiveness, and further has high strength in acid resistance, and a laminate including the same. Provided is an adhesive resin composition including an acid-modified polyolefin resin component having a melting point of higher than 80° C. and 140° C. or lower, a crosslinking agent component, and a solvent component, in which the solvent component contains an aromatic solvent, an aliphatic solvent, and a ketone-based solvent, the aromatic solvent has a highest boiling point, and the solvent component contains the aromatic solvent in an amount of 50 parts by mass or more and 80 parts by mass or less, the aliphatic solvent in an amount of 10 parts by mass or more and 30 parts by mass or less, and the ketone-based solvent in an amount of 5 parts by mass or more and 20 parts by mass or less, based on 100 parts by mass of a total amount of the solvent component.

11 Claims, 2 Drawing Sheets

ADHESIVE RESIN COMPOSITION AND LAMINATE

CROSS-REFERENCE TO RELATED APPLICATIONS

This application claims the priority from Japanese Patent Application No. 2017-160387 (filing date: Aug. 23, 2017). The entire teachings of the above application are incorporated herein by reference.

BACKGROUND OF THE INVENTION

(1) Field of the Invention

The present invention relates to an adhesive resin composition and a laminate.

(2) Description of Related Art

In the fields of outer packages and packages used in outer packaging, packaging or the like of industrial products such as electronic devices and batteries, and daily necessaries such as foods, beverages, cosmetics, and medicaments, a laminate obtained by combining and laminating a resin material such as polyethylene and polypropylene, and a metal material such as an aluminum foil is used.

In order to improve the adhesiveness between the resin material and the metal material, various studies regarding an adhesive composition for adhering these have been made.

For example, Japanese Patent No. 5771493 describes a melting and kneading-type adhesive resin composition containing a graft copolymer (G) obtained by, first, graft-polymerizing an acid-modified polyolefin resin (A) with a polyamide resin (B) to obtain a resin (C), and further graft-polymerizing the resin (C) with an epoxy group-containing resin (D) having two or more epoxy groups in one molecule, in which, based on 100% by mass of a total of the above-mentioned acid-modified polyolefin resin (A), the above-mentioned polyamide resin (B), and the above-mentioned epoxy group-containing resin (D), the above-mentioned acid-modified polyolefin resin (A) is contained in a range of 85 to 98% by mass, the above-mentioned polyamide resin (B) is contained in a range of 1 to 9% by mass, and the above-mentioned epoxy group-containing resin (D) is contained in a range of 1 to 14% by mass.

SUMMARY OF THE INVENTION

Since the adhesive resin composition described in Japanese Patent No. 5771493 contains an olefin-based resin component having a high melting point, it has low solubility and has been hardly used as a solvent-based adhesive resin composition. Additionally, when the solvent-based adhesive resin composition is produced, a crosslinking agent component is precipitated, and it is difficult to perform uniform coating in the coating step.

Meanwhile, for example, in an adhesive resin composition used in the interior of outer packages of batteries such as a lithium secondary battery, a hydrogen fuel battery, and a solar battery, the situation where the composition is brought into contact with an acidic electrolytic solution is assumed. For that reason, the adhesive resin composition is required to have high strength in acid resistance, in addition to high adhesiveness. In the present specification, "high strength in acid resistance" means that the adhesion strength is not reduced even when the adhesive resin composition is brought into contact with an acid.

The present invention has been made in view of the above-mentioned circumstances, and an object thereof is to provide an adhesive resin composition that can be uniformly applied, has high adhesiveness, and further has high strength in acid resistance, and a laminate including the same.

That is, the present invention has adopted the following constituent features.

[1] An adhesive resin composition comprising an acid-modified polyolefin resin component (A) having a melting point of higher than 80° C. and 140° C. or lower, a crosslinking agent component (B), and a solvent component (S), wherein the solvent component (S) contains an aromatic solvent (S1), an aliphatic solvent (S2), and a ketone-based solvent (S3), the aromatic solvent (S1) has a highest boiling point, and the solvent component (S) contains the aromatic solvent (S1) in an amount of 50 parts by mass or more and 80 parts by mass or less, the aliphatic solvent (S2) in an amount of 10 parts by mass or more and 30 parts by mass or less, and the ketone-based solvent (S3) in an amount of 5 parts by mass or more and 20 parts by mass or less, based on 100 parts by mass of a total amount of the solvent component (S).

[2] The adhesive resin composition according to [1], further comprising a resin component (C) having an amino group at a molecular end.

[3] The adhesive resin composition according to [1] or [2], wherein the aliphatic solvent (S2) is methylcyclohexane.

[4] The adhesive resin composition according to any one of [1] to [3], wherein the ketone-based solvent (S3) is methyl ethyl ketone.

[5] The adhesive resin composition according to any one of [1] to [4], wherein the aromatic solvent (S1) is toluene.

[6] The adhesive resin composition according to any one of [1] to [5], wherein the adhesive resin composition has a solid content concentration of 5% by mass or more and 20% by mass or less.

[7] The adhesive resin composition according to any one of [1] to [6], wherein the acid-modified polyolefin resin component (A) has an acid addition amount of 0.5% by mass or more and 3.0% by mass or less.

[8] The adhesive resin composition according to any one of [1] to [7], wherein the crosslinking agent component (B) is a resin component (B1) having an epoxy group in a molecule.

[9] The adhesive resin composition according to any one of [2] to [8], wherein the resin component (C) is at least one selected from the group consisting of an olefin resin in which a molecular end is modified with an amino group, a polyamine resin, a polyamide resin in which a molecular end is modified with an amino group, a melamine resin, and a urea resin.

[10] The adhesive resin composition according to any one of [2] to [9], wherein the resin component (C) has a weight average molecular weight of 2,000 or more.

[11] The adhesive resin composition according to any one of [1] to [10], wherein the crosslinking agent component (B) is a novolac-modified epoxy resin.

[12] The adhesive resin composition according to any one of [1] to [11], wherein the crosslinking agent component (B) contains a compound having a bisphenol A structure in a molecule.

[13] The adhesive resin composition according to any one of [1] to [12], further comprising an isocyanate compound (D).

[14] A laminate comprising an adherend and an adhesive resin layer laminated on one side of the adherend, wherein the adhesive resin layer is formed of the adhesive resin composition according to any one of [1] to [13].

The present invention can provide an adhesive resin composition that can be uniformly applied, has high adhesiveness, and further has high strength in acid resistance, and a laminate including the same.

DETAILED DESCRIPTION OF THE INVENTION

Figure 1:
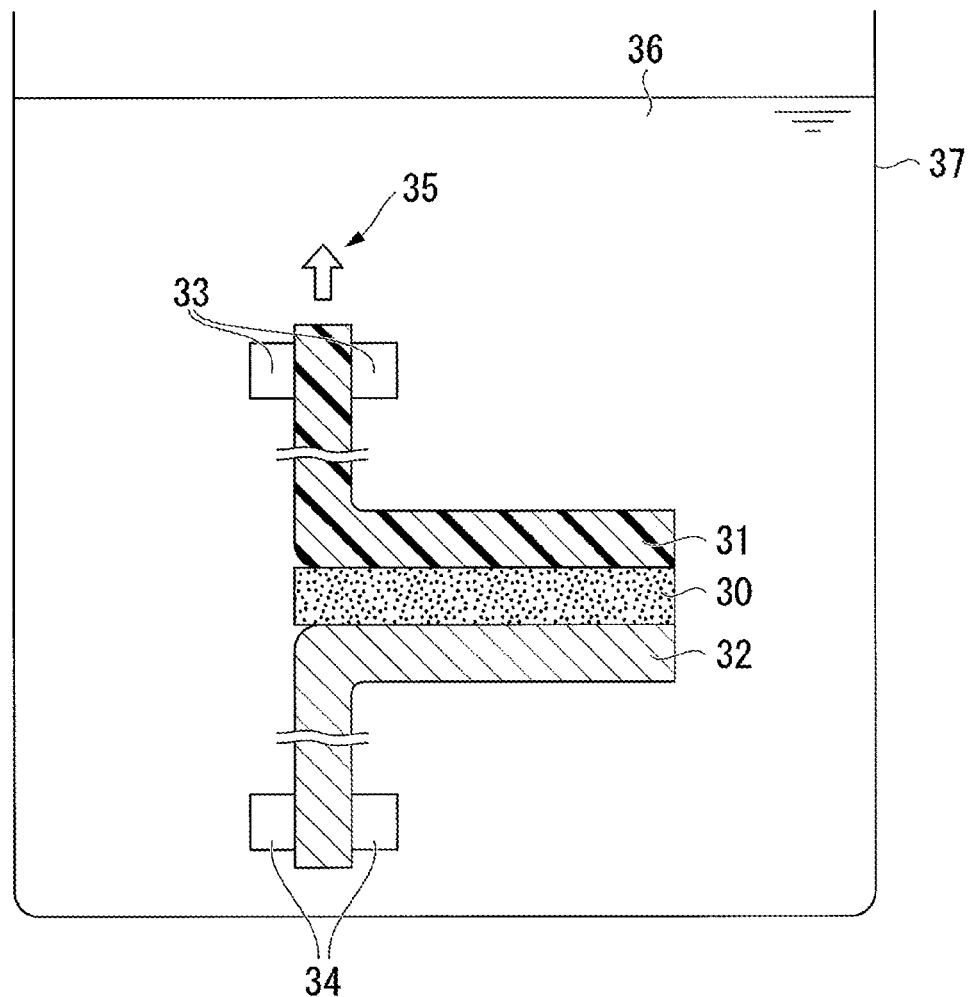
FIG. 1 is a schematic view of a device used in a peeling test.

In the present specification, as a molecular weight of a polymer, a weight average molecular weight in terms of polystyrene by gel permeation chromatography (GPC) is used.

Hereinafter, the present invention will be described based on preferred embodiments.

<Adhesive Resin Composition>

The adhesive resin composition of the present invention comprises an acid-modified polyolefin resin component (A) having a melting point of higher than 80° C. and 140° C. or lower, a crosslinking agent component (B), and a solvent component (S). Furthermore, the solvent component (S) contains an aromatic solvent (S1), an aliphatic solvent (S2), and a ketone-based solvent (S3). It is characterized in that the above-mentioned aromatic solvent (S1) has the highest boiling point, and the solvent component (S) contains the above-mentioned aromatic solvent (S1) in an amount of 50 parts by mass or more and 80 parts by mass or less, the above-mentioned aliphatic solvent (S2) in an amount of 10 parts by mass or more and 30 parts by mass or less, and the above-mentioned ketone-based solvent (S3) in an amount of 5 parts by mass or more and 20 parts by mass or less, based on 100 parts by mass of a total amount of the above-mentioned solvent component (S). The adhesive resin composition of the present invention is in a liquid state. For that reason, by applying the composition to an adherend and drying the adherend, an adhesive film can be formed.

The adhesive resin composition of the present invention exerts the effect that it can be uniformly applied, has high adhesiveness, and further has high acid resistance. For that reason, the adhesive resin composition can be suitably used in the interior of outer packages of batteries such as a lithium secondary battery, a hydrogen fuel battery, and a solar battery, where the adhesive resin composition is assumed to be brought into contact with an acidic electrolytic solution.

Hereinafter, each component constituting the adhesive resin composition of the present invention will be described.

<<(A) Component>>

The adhesive resin composition of the present embodiment contains an acid-modified polyolefin resin component having a melting point of higher than 80° C. and 140° C. or lower (hereinafter, described as "(A) component").

In the present embodiment, the (A) component having a high melting point of higher than 80° C. is used, so that the heat resistance can be imparted to the adhesive resin composition. The melting point is preferably 85° C. or higher, more preferably 90° C. or higher, and particularly preferably 95° C. or higher.

In the present embodiment, the (A) component is a polyolefin-based resin modified with an unsaturated carboxylic acid or a derivative thereof, and has an acid functional group such as a carboxy group or a carboxylic anhydride group in the polyolefin-based resin. Since the acid functional group such as a carboxy group or a carboxylic anhydride group interacts with the surface of an adherend, the (A) component is a component contributing to the adhesiveness.

The (A) component is obtained by modification of a polyolefin-based resin with an unsaturated carboxylic acid or a derivative thereof, copolymerization of an acid functional group-containing monomer with olefins, or the like. Inter alia, as the (A) component, a material obtained by acid-modifying a polyolefin-based resin is preferable. An example of the acid-modifying method includes graft modification of melting and kneading a polyolefin resin and an acid functional group-containing monomer, in the presence of a radical polymerization initiator such as an organic peroxide or an aliphatic azo compound.

Examples of the above-mentioned polyolefin-based resin include polyethylene, polypropylene, poly-1-butene, polyisobutylene, a copolymer of propylene and ethylene, a copolymer of propylene and an olefin-based monomer, and the like.

Examples of the above-mentioned olefin-based monomer subjected to copolymerization include 1-butene, isobutylene, 1-hexene, and the like.

Inter alia, as the (A) component, maleic anhydride-modified polypropylene is preferable from the viewpoint of the adhesiveness, durability, and the like.

Weight Average Molecular Weight

In the present embodiment, the (A) component has a weight average molecular weight of preferably 30,000 or more, more preferably 40,000 or more, and particularly preferably 50,000 or more. Additionally, the weight average molecular weight is preferably 150,000 or less, more preferably 140,000 or less, and particularly preferably 130,000 or less. The above-mentioned upper limit values and lower limit values can be arbitrarily combined.

Acid Addition Amount

Examples of the unsaturated carboxylic acid to be used in modification include acrylic acid, methacrylic acid, maleic acid, nadic acid, fumaric acid, itaconic acid, crotonic acid, citraconic acid, sorbic acid, mesaconic acid, angelic acid, and the like. Additionally, examples of the derivative of the unsaturated carboxylic acid include acid anhydrides, esters, amides, imides, metal salts, and the like, and specific examples thereof include maleic anhydride, itaconic anhydride, citraconic anhydride, nadic anhydride, methyl acrylate, methyl methacrylate, ethyl acrylate, butyl acrylate, maleic acid monoethyl ester, acrylamide, maleic acid monoamide, maleimide, N-butylmaleimide, sodium acrylate, sodium methacrylate, and the like. Among these, an unsaturated dicarboxylic acid and a derivative thereof are preferable, and particularly, maleic anhydride or phthalic anhydride is suitable.

In the present embodiment, it is preferable that a carboxylic acid addition amount of the (A) component is 0.5% by mass or more and 3.0% by mass or less.

<<Crosslinking Agent Component (B)>>

The adhesive resin composition of the present embodiment contains a crosslinking agent component (B) (hereinafter, described as "(B) component").

Examples of the (B) component include a copolymer of an epoxy group-containing vinyl monomer, a phenoxy resin synthesized from bisphenols and epichlorohydrin, various epoxy resins, and the like. In the present embodiment, it is preferable that the above-mentioned crosslinking agent component (B) is a resin component (B1) having an epoxy group in a molecule.

Additionally, as the (B) component, glycidyl esters such as glycidyl methacrylate (GMA) and glycidyl acrylate, glycidyl ethers such as allyl glycidyl ether, epoxyalkenes such as epoxybutene, and the like may be used.

Additionally, in the copolymer of an epoxy group-containing vinyl monomer, examples of other monomers that are copolymerized with the epoxy group-containing vinyl monomer include olefins such as ethylene and propylene, acrylic-based monomers such as (meth)acrylic acid ester, vinyl acetate, and the like.

Examples of the copolymer of an epoxy group-containing vinyl monomer include an ethylene-glycidyl methacrylate (E-GMA) copolymer and the like.

As the phenoxy resin, a phenoxy resin having epoxy groups at both ends is used, and examples of bisphenols thereof include bisphenol A, bisphenol F, a copolymerization type thereof, and the like.

Examples of the (B) component include a bisphenol-type epoxy resin, a novolac-type epoxy resin, a glycidyl amine-type epoxy resin, a glycidyl ester-type epoxy resin, and the like. In the present embodiment, it is preferable that the (B) component is a novolac-modified epoxy resin. Additionally, in the present embodiment, it is preferable that the (B) component contains a compound having a bisphenol A structure in the molecule.

From the viewpoint of improving adhesiveness, it is preferable that the (B) component has a weight average molecular weight (Mw) in a range of 500 or more and 50,000 or less.

Content

In the present embodiment, the content of the above-mentioned resin component (B) is 1 part by mass or more, preferably 5 parts by mass or more, and more preferably 10 parts by mass or more, based on 100 parts by mass of the above-mentioned acid-modified polyolefin resin component (A). Additionally, the content is 30 parts by mass or less, preferably 25 parts by mass or less, and more preferably 22 parts by mass or less.

The above-mentioned upper limit values and lower limit values can be arbitrarily combined. By adjusting the content in the above-mentioned range, an adhesive resin composition having high adhesiveness and high durability can be obtained.

<<(C) Component>>

The adhesive resin composition of the present embodiment preferably contains a resin component having an amino group at a molecular end (hereinafter, described as "(C) component"). The (C) component generates amine, for example, when attacked by hydrofluoric acid contained in the electrolytic solution. The generated amine neutralizes hydrofluoric acid and can exert high acid resistance. For that reason, the (C) component is a component contributing to the acid resistance.

It is preferable that the (C) component is at least one selected from the group consisting of an olefin resin in which a molecular end is modified with an amino group, a polyamine resin, a polyamide resin in which a molecular end is modified with an amino group, a melamine resin, and a urea resin.

More specifically, examples of the (C) component include diethylenetriamine (DETA), triethylenetetramine (TETA), tetraethylenepentamine (TEPA), an amine-modified hydrogenated styrene-based thermoplastic elastomer in which a molecular end is modified with an amino group, polyethyleneimine, nylon 6, nylon 66, nylon 12, and the like.

In the present embodiment, from the viewpoint of improving crosslinking strength at the time of adhesion, the (C) component has a weight average molecular weight of preferably 2,000 or more and more preferably 5,000 or more. The upper limit value is not particularly limited, but one example can be 1,000,000 or less, 500,000 or less, or 200,000 or less.

Content

The content of the above-mentioned resin component (C) is 0.5 parts by mass or more, preferably 1 part by mass or more, more preferably 5 parts by mass or more, and particularly preferably 6 parts by mass or more, based on 100 parts by mass of the above-mentioned acid-modified polyolefin resin component (A). Additionally, the content is 15 parts by mass or less, preferably 14 parts by mass or less, more preferably 13 parts by mass or less, and particularly preferably 12 parts by mass or less. By adjusting the addition amount in the above-mentioned range, the adhesion strength can be sufficiently retained while highly maintaining the effect of neutralizing hydrofluoric acid.

The above-mentioned upper limit values and lower limit values can be arbitrarily combined.

<<Solvent Component (S)>>

The solvent component (S) contains an aromatic solvent (S1) (hereinafter, may be described as "(S1) component"), an aliphatic solvent (S2) (hereinafter, may be described as "(S2) component"), and a ketone-based solvent (S3) (hereinafter, may be described as "(S3) component"). It is characterized in that among these, the boiling point of the (S1) component is the highest.

Aromatic Solvent (S1)

Examples of the (S1) component include toluene (boiling point: 110.6° C.), ortho-xylene (boiling point: 144° C.), meta-xylene (boiling point: 138° C.), para-xylene (boiling point: 138° C.), and the like. In the present embodiment, it is preferable that the (S1) component is toluene.

Aliphatic Solvent (S2)

Examples of the (S2) component include methylcyclohexane (boiling point: 101° C.), heptane (boiling point: 98.42° C.), octane (boiling point: 125° C.), and the like. In the present embodiment, it is preferable that the (S2) component is methylcyclohexane.

Ketone-Based Solvent (S3)

Examples of the (S3) component include acetone (boiling point: 56° C.), methyl ethyl ketone (boiling point: 79.64° C.), methyl isobutyl ketone (boiling point: 116.2° C.), cyclopentanone (boiling point: 49° C.), and the like. In the present embodiment, it is preferable that the (S3) component is methyl ethyl ketone.

As the solvent component (S), a combination of the (S1) component, the (S2) component, and the (S3) component is not particularly limited, as long as the combination makes the boiling point of the (S1) component the highest. As a preferable example, it is preferable that toluene is selected as the (S1) component, methylcyclohexane is selected as the (S2) component, and methyl ethyl ketone is selected as the (S3) component. Furthermore, in the present embodiment, it is more preferable that the solvent component (S) consists only of these three kinds of components.

In the present embodiment, the contents of the (S1) component, the (S2) component, and the (S3) component are as follows: the content of the (S1) component is 50 parts by mass or more and 80 parts by mass or less, the content of the (S2) component is 10 parts by mass or more and 30 parts by mass or less, and the content of the (S3) component is 5 parts by mass or more and 10 parts by mass or less, based on 100 parts by mass of the total amount of the above-mentioned solvent component (S).

The (S1) component exerts certain solubility to both the above-mentioned (A) component and the above-mentioned (B) component. The (S2) component has small solubility to the above-mentioned (B) component, but exerts high solubility to the above-mentioned (A) component. The (S3) component has small solubility to the above-mentioned (A) component, but exerts high solubility to the above-mentioned (B) component.

In the present embodiment, by combining solvent components that exert high solubility to each resin component, the solubility of the resin component is improved and the adhesive resin composition can be uniformly applied. Even when the (S2) component and the (S3) component volatilize faster in the case of applying the adhesive resin composition onto an adherend, the adhesive resin composition of the present embodiment exerts certain solubility to both the above-mentioned (A) component and the above-mentioned (B) component, and the (S1) component having a high boiling point remains. For that reason, it is presumed that aggregation of the resin components and generation of lumps are suppressed, and the composition can be uniformly applied.

<<Optional Components>>

It is preferable that the adhesive resin composition of the present embodiment comprises an isocyanate compound (D) (hereinafter, described as "(D) component").

Examples of the (D) component include bifunctional or tri- or more-functional isocyanate compounds, bifunctional or tri- or more-functional epoxy compounds, bifunctional or tri- or more-functional acrylate compounds, metal chelate compounds, organosilicon compounds such as a silane coupling agent, carbodiimide compounds, and the like. Inter alia, a polyisocyanate compound (bifunctional or tri- or more-functional isocyanate compound) is preferable, and a tri- or more-functional isocyanate compound is more preferable.

When the adhesive resin composition contains the (D) component, it is preferable that the composition contains the (D) component in an amount of 0.1 parts by mass or more and 10 parts by mass or less, based on 100 parts by mass of the above-mentioned (A) component. The (D) components may be used alone, or two or more kinds thereof may be used concurrently.

The tri- or more-functional isocyanate compound may be a polyisocyanate compound having at least three isocyanate (NCO) groups in one molecule. The polyisocyanate compound is classified into aliphatic isocyanate, aromatic isocyanate, acyclic isocyanate, alicyclic isocyanate or the like, and any of them may be used. Specific examples of the polyisocyanate compound include aliphatic isocyanate compounds such as hexamethylene diisocyanate (HDI), isophorone diisocyanate (IPDI), and trimethyl hexamethylene diisocyanate (TMDI), and aromatic isocyanate compounds such as diphenylmethane diisocyanate (MDI), xylylene diisocyanate (XDI), hydrogenated xylylene diisocyanate (H6XDI), dimethyldiphenylene diisocyanate (TOID), and tolylene diisocyanate (TDI).

Examples of the tri- or more-functional isocyanate compound include biuret-modified products and isocyanurate-modified products of diisocyanates (compounds having two NCO groups in one molecule), adduct products (polyol-modified products) with tri- or more-hydric polyols (compounds having at least three OH groups in one molecule) such as trimethylolpropane (TMP) and glycerol, and the like.

The adhesive resin composition of the present embodiment has a solid content concentration of preferably 3% by mass or more, more preferably 5% by mass or more, and particularly preferably 7% by mass or more. Additionally, the solid content concentration is preferably 20% by mass or less, more preferably 18% by mass or less, and particularly preferably 16% by mass or less. The above-mentioned upper limit values and lower limit values of the solid content concentration can be arbitrarily combined. By adjusting the solid content concentration as described above, an adhesive resin composition having good wettability and good coatability can be obtained.

<Laminate>

The laminate of the present invention includes a substrate and an adhesive resin layer including the adhesive resin composition of the present invention laminated on at least one side of the substrate. By laminating the above-mentioned adhesive resin layer on one side or both sides of the substrate, the laminate can adhere to an adherend with use of the above-mentioned adhesive resin layer. It is not necessary that the substrate itself has adhesiveness, and a substrate that can adhere to the above-mentioned adhesive resin layer is preferable. Examples of the substrate include various substrates such as metal, glass, and plastics. In the present embodiment, the adhesive resin layer is formed by applying the adhesive resin composition onto an adherend, followed by drying.

EXAMPLES

The present invention will be described in further detail below by way of examples, but the present invention is not limited by these examples.

<Acid Resistance Test>

An acid resistance test will be described by way of FIG. 1.

Figure 2:
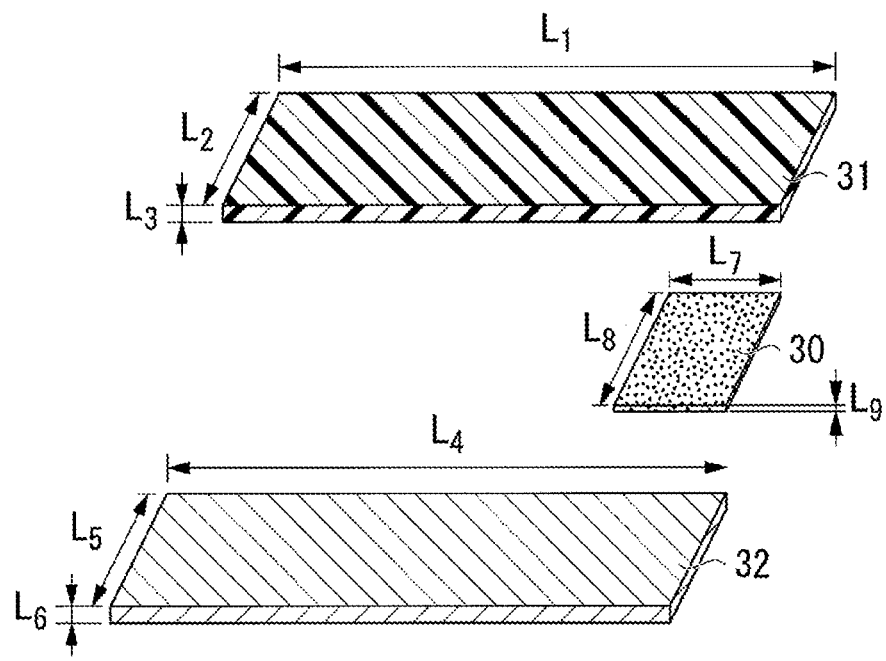
FIG. 2 is a schematic view illustrating a laminated state of a test piece used in a peeling test.

First, a laminate shown in FIG. 2 was used as a test piece.

An adhesive resin composition layer 30 of each of Examples and Comparative Examples was applied in a shape of 10 mm ($L_7$)×10 mm ($L_8$)×3 μm ($L_9$) onto a polyethylene terephthalate film 32 having a thickness ($L_6$) of 100 μm, a length ($L_4$) of 50 mm, and a width ($L_5$) of 10 mm, and dried at 110° C. for 1 minute to form an adhesive film on the polyethylene terephthalate film.

Thereafter, a polypropylene film 31 having a thickness ($L_3$) of 50 μm, a length ($L_1$) of 50 mm, and a width ($L_2$) of 10 mm was stuck on a surface on which the adhesive film had been formed, followed by bonding with a load of 2 kg at 130° C. At that time, one ends thereof were aligned as shown in FIG. 2 to form the laminate.

This laminate was immersed in a water bath 37 of an acid solution (symbol 36) containing 1,000 ppm of hydrogen fluoride and having a pH of 2 for 1,000 hours, and the polyethylene terephthalate film 32 and the polypropylene film 31 were each bent at a position of an end part of the adhesive resin composition layer 30 so that the polypropylene film 31 was on a tensile side. The polypropylene film 31 was held with a holding device 33, and the polyethylene terephthalate film 32 was fixed by being held with a holding device 34. The polypropylene film 31 was stretched in a tensile direction shown with a symbol 35 in the above-mentioned water bath, to measure the peeling strength.

The peeling strength was measured at a tension speed of 50 mm/min. The peeling strength (N/mm$^2$) at that time was measured, and results of evaluation according to the following evaluation criteria are described in the following tables.
[Evaluation Criteria]
Evaluation was performed on the following four stages, and Δ or higher grade was determined to be acceptable.
⊙: 0.5 N/mm² or more
◯: 0.3 N/mm² or more and less than 0.5 N/mm²
Δ: 0.1 N/mm² or more and less than 0.3 N/mm²
x: Less than 0.1 N/mm²

<Adhesiveness Test>
A similar laminate to the test piece used in the above-mentioned <Acid Resistance Test> was used as a test piece.
The resulting laminate was placed into a high temperature thermo machine at 80° C. and a humidity of 95% for 1,000 hours.
Thereafter, the test piece was dried under conditions of 23° C. and a humidity of 50% for 1 hour.
The polyethylene terephthalate film and the polypropylene film were each bent at a position of an end part of the adhesive layer so that the polypropylene film was on a tensile side. The polypropylene film was held with a holding device, the polyethylene terephthalate film was fixed by being held with a holding device, and the polypropylene film was stretched to measure the peeling strength.
The peeling strength was measured at a tension speed of 50 mm/min. The peeling strength (N/mm²) at that time was measured, and results of evaluation according to the following evaluation criteria are described in the following tables.
[Evaluation Criteria]
Evaluation was performed on the following four stages, and Δ or higher grade was determined to be acceptable.
⊙: 0.7 N/mm² or more
◯: 0.5 N/mm² or more and less than 0.7 N/mm²
Δ: 0.3 N/mm² or more and less than 0.5 N/mm²
x: Less than 0.3 N/mm²

<Uniform Coatability Test>
The resulting adhesive resin composition was applied onto a PET film by hand coating, and dried at 100° C. for 1 minute. Thereafter, a sample having a size of 20 cm×30 cm was produced, the presence or absence of application unevenness was confirmed visually, and was evaluated according to the following criteria. Evaluation was performed on the following four stages, and Δ or higher grade was determined to be acceptable.
⊙: There is no coating unevenness.
◯: There is fine coating unevenness.
Δ: A resin component and a solvent component are separated.
x: A resin component is precipitated.

<Heat Resistance Test>
A similar laminate to the test piece used in the above-mentioned <Acid Resistance Test> was used as a test piece.
The resulting laminate was placed in a high temperature thermo machine at 120° C. for 1,000 hours.
Thereafter, the laminate was taken out, the state of the laminate was observed, and peeling was observed visually. Results are shown in the following tables.
Evaluation was performed based on the following four stages, and Δ or higher grade was determined to be acceptable.
⊙: No visible peeling was observed, being good.
◯: Visible remarkable peeling was not observed.
Δ: Peeling was observed at some places.
x: Peeling was observed on the entire surface.

<Production of Adhesive Resin Composition>
The (A) component, the (B) component, the (C) component, the (S) component, and the (D) component shown in the following Tables 1 and 2 were mixed to obtain adhesive resin compositions of Examples 1 to 7 and Comparative Examples 1 to 7. In Tables 1 and 2 below, a numerical value shown in [ ] is a blending amount (parts by mass).

TABLE 1

|  | (A) Component | (B) Component | (C) Component | (D) Component | (S) Component | | |
|---|---|---|---|---|---|---|---|
|  |  |  |  |  | (S1) Component | (S2) Component | (S3) Component |
| Example 1 | (A)-1 [100] | (B)-1 [20] | (C)-1 [10] | — | (S)-1 [72] | (S)-2 [18] | (S)-3 [10] |
| Example 2 | (A)-1 [100] | (B)-1 [20] | (C)-1 [10] | — | (S)-1 [80] | (S)-2 [10] | (S)-3 [10] |
| Example 3 | (A)-1 [100] | (B)-1 [20] | (C)-1 [10] | — | (S)-1 [60] | (S)-2 [30] | (S)-3 [10] |
| Example 4 | (A)-1 [100] | (B)-1 [20] | (C)-2 [10] | — | (S)-1 [70] | (S)-2 [20] | (S)-3 [10] |
| Example 5 | (A)-1 [100] | (B)-1 [15] | (C)-1 [10] | (D)-1 [5] | (S)-1 [70] | (S)-2 [20] | (S)-3 [10] |
| Example 6 | (A)-1 [100] | (B)-1 [20] | (C)-1 [10] | — | (S)-1 [70] | (S)-2 [20] | (S)-3 [10] |
| Example 7 | (A)-1 [100] | (B)-1 [20] | — | — | (S)-1 [72] | (S)-2 [18] | (S)-3 [10] |

TABLE 2

|  | (A) Component | (B) Component | (C) Component | (D) Component | (S) Component | | |
|---|---|---|---|---|---|---|---|
|  |  |  |  |  | (S1) Component | (S2) Component | (S3) Component |
| Comparative Example 1 | (A)-1 [100] | (B)-1 [20] | — | — | (S)-1 [100] | — | — |
| Comparative Example 2 | (A)-1 [100] | (B)-1 [20] | (C)-2 [10] | — | (S)-1 [100] | — | — |
| Comparative | (A)-1 | (B)-1 | (C)-1 | — | (S)-1 | — | — |

TABLE 2-continued

|  | (A) Component | (B) Component | (C) Component | (D) Component | (S1) Component | (S2) Component | (S3) Component |
|---|---|---|---|---|---|---|---|
| Example 3 | [100] | [20] | [10] | — | [100] | | |
| Comparative Example 4 | (A)-1 [100] | (B)-1 [20] | (C)-1 [10] | — | (S)-1 [40] | (S)-2 [40] | (S)-3 [20] |
| Comparative Example 5 | (A)-1 [100] | (B)-1 [20] | (C)-1 [10] | — | (S)-1 [93] | (S)-2 [5] | (S)-3 [2] |
| Comparative Example 6 | (A)-2 [100] | (B)-1 [20] | (C)-1 [10] | — | (S)-1 [80] | (S)-2 [10] | (S)-3 [10] |
| Comparative Example 7 | (A)-1 [100] | (B)-1 [20] | — | — | (S)-1 [100] | — | — |

In the above-mentioned tables, each symbol means the following material.
- (A)-1: Maleic acid-modified polypropylene-1, molecular weight: 90,000, acid addition: 1.1% by mass, melting point: 90° C.
- (A)-2: Maleic acid-modified polypropylene-2, molecular weight: 70,000, acid addition: 1.5% by mass, melting point: 80° C.
- (B)-1: Epoxy A, special novolac-type epoxy resin (epoxy equivalent: 200, softening point: 70° C.), which comprises a bisphenol A skeleton in a molecule and a novolac epoxy group.
- (C)-1: Amine-modified hydrogenated styrene-based thermoplastic elastomer.
- (C)-2: Nylon resin (having an amino group as a terminal substituent).
- (D)-1: Isocyanate compound (tolylene diisocyanate).
- (S)-1: Toluene (boiling point: 110.6° C.).
- (S)-2: Methylcyclohexane (boiling point: 101° C.).
- (S)-3: Methyl ethyl ketone (boiling point: 79.64° C.).

TABLE 3

|  | Adhesiveness | Heat Resistance | Acid Resistance | Uniform Coatability |
|---|---|---|---|---|
| Example 1 | ⊙ | ⊙ | ○ | ⊙ |
| Example 2 | ○ | ⊙ | ○ | ○ |
| Example 3 | ○ | ⊙ | ○ | ○ |
| Example 4 | ⊙ | ⊙ | ⊙ | ⊙ |
| Example 5 | ⊙ | ⊙ | ⊙ | ⊙ |
| Example 6 | ⊙ | ⊙ | ⊙ | ⊙ |
| Example 7 | ○ | ○ | Δ | ⊙ |
| Comparative Example 1 | Δ | Δ | Δ | X |
| Comparative Example 2 | Δ | ○ | ○ | X |
| Comparative Example 3 | Δ | ○ | ○ | X |
| Comparative Example 4 | Δ | Δ | ○ | X |
| Comparative Example 5 | Δ | Δ | ○ | X |
| Comparative Example 6 | ○ | X | ○ | Δ |
| Comparative Example 7 | X | Δ | X | Δ |

As shown in the above-mentioned results, the adhesive resin compositions of Examples 1 to 7 comprising the (S) component containing the solvent (S1), the solvent (S2), and the solvent (S3) could be uniformly applied and had high acid resistance.

In contrast, in Comparative Examples 1 to 3 and 7 containing only the solvent (S1), the solubility of the resin components was insufficient, and the composition could not be uniformly applied. Additionally, in Comparative Examples 4 and 5 in which the solvent (S1), the solvent (S2), and the solvent (S3) were contained, but a blending ratio of each solvent component was outside the scope of the present invention, the solubility of the resin components was insufficient, and the composition could not be uniformly applied. Additionally, in Comparative Example 6 including the (A) component having a melting point of 80° C., the result regarding the heat resistance was not favorable.

Additionally, the adhesiveness in Example 6 was particularly higher than the adhesiveness in other examples, and was most excellent.

DESCRIPTION OF THE REFERENCE NUMERALS

- 30: Adhesive resin composition layer
- 31: Polypropylene film
- 32: Polyethylene terephthalate film
- 33, 34: Holding device
- 36: Acid solution
- 37: Water bath

What is claimed is:

1. An adhesive resin composition comprising:
   an acid-modified polyolefin resin component (A) having a melting point of higher than 80° C. and 140° C. or lower;
   a crosslinking agent component (B); and
   a solvent component (S),
   wherein
   said solvent component (S) contains an aromatic solvent (S1), an aliphatic solvent (S2), and a ketone-based solvent (S3),
   said aromatic solvent (S1) is toluene,
   said aliphatic solvent (S2) is methylcyclohexane,
   said ketone-based solvent (S3) is methyl ethyl ketone,
   said aromatic solvent (S1) has a highest boiling point, and
   said solvent component (S) contains said aromatic solvent (S1) in an amount of 50 parts by mass or more and 80 parts by mass or less, said aliphatic solvent (S2) in an amount of 10 parts by mass or more and 30 parts by mass or less, and said ketone-based solvent (S3) in an amount of 5 parts by mass or more and 20 parts by mass or less, based on 100 parts by mass of a total amount of said solvent component (S).

2. The adhesive resin composition according to claim 1, further comprising a resin component (C) having an amino group at a molecular end.

3. The adhesive resin composition according to claim 1, wherein said adhesive resin composition has a solid content concentration of 5% by mass or more and 20% by mass or less.

4. The adhesive resin composition according to claim 1, wherein said acid-modified polyolefin resin component (A) has an acid addition amount of 0.5% by mass or more and 3.0% by mass or less.

5. The adhesive resin composition according to claim 1, wherein said crosslinking agent component (B) is a resin component (B1) having an epoxy group in a molecule.

6. The adhesive resin composition according to claim 2, wherein said resin component (C) is at least one selected from the group consisting of an olefin resin in which a molecular end is modified with an amino group, a polyamine resin, a polyamide resin in which a molecular end is modified with an amino group, a melamine resin, and a urea resin.

7. The adhesive resin composition according to claim 2, wherein said resin component (C) has a weight average molecular weight of 2,000 or more.

8. The adhesive resin composition according to claim 1, wherein said crosslinking agent component (B) is a novolac-modified epoxy resin.

9. The adhesive resin composition according to claim 1, wherein said crosslinking agent component (B) contains a compound having a bisphenol A structure in a molecule.

10. The adhesive resin composition according to claim 1, further comprising an isocyanate compound (D).

11. A laminate comprising:
   an adherend; and
   an adhesive resin layer laminated on one side of said adherend,
   wherein said adhesive resin layer is formed of the adhesive resin composition according to claim 1.

* * * * *